No. 778,783.

Patented December 27, 1904.

UNITED STATES PATENT OFFICE.

JULIUS HOFMEIER, OF VIENNA, AUSTRIA-HUNGARY, ASSIGNOR TO ACTIEN-GESELLSCHAFT FÜR CHEMISCHE INDUSTRIE, OF VIENNA, AUSTRIA-HUNGARY.

PROCESS OF PRODUCING A NUTRITIVE SUBSTANCE FROM BLOOD.

SPECIFICATION forming part of Letters Patent No. 778,783, dated December 27, 1904.

Application filed July 25, 1903. Serial No. 166,965.

*To all whom it may concern:*

Be it known that I, JULIUS HOFMEIER, a subject of the Emperor of Austria-Hungary, residing at Brahmsplatz 7, Vienna IV, in the Province of Lower Austria and Empire of Austria-Hungary, have invented certain new and useful Improvements in Processes of Producing Nutritive Substances from Blood, of which the following is a specification.

The object of the present invention is a process of producing from blood a nutritive substance which contains iron and phosphorus and has the valuable property to produce no hemotin when digested with gastric juice in contrast with hemoglobin and the so-called "native" hemoglobin preparations which, as well known, produce hematin in insoluble state when treated with gastric juice.

The present process consists, essentially, in digesting coagulated blood or a solution of hemoglobin at a temperature of about 60° to 90° centigrade with an alkaline solution until a proof of albuminate precipitated therefrom with diluted acids no longer produces flocks when digested with artificial gastric juice, whereafter hydrochloric acid is added until the albuminates are wholly precipitated.

The best manner of proceeding for producing the said nutritive matter is the following one: One kilogram of coagulated blood, blood corpuscles, or a twenty-per-cent. solution of hemoglobin is mixed with fifty cubic centimeters of a solution of sodium hydrate of 35° to 40° Baumé, and after twenty-four hours this mixture is heated to a temperature of 80° to 85° centigrade. The said mixture, which has been liquefied by heating, is kept one or two hours at the aforesaid temperature, and after this time hydrochloric acid is added until the whole mass shows acid reaction upon litmus. The albuminates precipitated thereby and containing iron and phosphorus are separated by pressing, if necessary, redissolved and precipitated, and dried at low temperature.

The nutritious matter produced in the described way is dissolved completely and without residuum when digested with gastric juice, in consequence of which the iron contained in the preparation is easily and completely absorbed by the organism.

Having now described my invention, what I claim as new, and desire to secure by Letters Patent, is—

A process for producing a nutritive substance from blood consisting in treating coagulated blood at a temperature of 60° to 90° centigrade with an alkaline solution until a proof of albuminate precipitated therefrom with diluted acids no longer produces flocks when digested with artificial gastric juice, adding then hydrochloric acid, until the albuminates are wholly precipitated, separating the precipitated albuminates by pressing and drying them at low temperature, substantially as described and for the purpose set forth.

Signed at Vienna, in the Province of Lower Austria and Empire of Austria-Hungary, this 9th day of July, A. D. 1903.

JULIUS HOFMEIER.

Witnesses:
FRITS FUCHS,
ALFRED RAUHAUPT.